US009137347B1

(12) United States Patent
Lee et al.

(10) Patent No.: US 9,137,347 B1
(45) Date of Patent: Sep. 15, 2015

(54) REMOTELY CONFIGURING A WIRELESS DEVICE AND UPLOADING MEDIA TO A SERVER

(75) Inventors: Ji Lee, Santa Clara, CA (US); Vivian Lum, Mountain View, CA (US); Bonnie Han, Union City, CA (US); Matthew Steiner, Mountain View, CA (US); Karen Ouk, Mountain View, CA (US)

(73) Assignee: Google Inc., Mountain View, CA (US)

(*) Notice: Subject to any disclaimer, the term of this patent is extended or adjusted under 35 U.S.C. 154(b) by 364 days.

(21) Appl. No.: 13/462,917

(22) Filed: May 3, 2012

Related U.S. Application Data

(60) Provisional application No. 61/632,417, filed on Apr. 5, 2012.

(51) Int. Cl.
*H04M 1/66* (2006.01)
(52) U.S. Cl.
CPC ...................................... *H04M 1/66* (2013.01)
(58) Field of Classification Search
CPC . H04L 63/0838; H04L 9/3226; H04L 65/105; H04L 65/4038; H04L 65/4053; H04L 67/306; H04L 63/08; H04L 9/3247; H04M 2201/38; H04M 1/72555; H04M 3/42221; G06F 2221/2119
USPC ............ 455/412.1, 411, 419, 418, 432.1, 502
See application file for complete search history.

(56) References Cited

U.S. PATENT DOCUMENTS

| 7,697,040 | B2 | 4/2010 | Sorensen et al. |
| 8,009,194 | B2 | 8/2011 | Anderson et al. |
| 8,184,613 | B2* | 5/2012 | Patel et al. ..................... 370/351 |
| 2005/0102381 | A1* | 5/2005 | Jiang et al. ..................... 709/220 |
| 2006/0031126 | A1* | 2/2006 | Ma et al. .......................... 705/26 |
| 2009/0042540 | A1* | 2/2009 | Bodnar et al. ................ 455/410 |
| 2010/0277611 | A1 | 11/2010 | Holt et al. |
| 2010/0296441 | A1 | 11/2010 | Barkan |
| 2011/0018998 | A1 | 1/2011 | Guzik |
| 2011/0125723 | A1 | 5/2011 | McAleer et al. |
| 2011/0201306 | A1* | 8/2011 | Ali Al-Harbi ................. 455/411 |
| 2011/0309921 | A1* | 12/2011 | Tachibana .................. 340/425.1 |
| 2013/0254858 | A1* | 9/2013 | Giardina et al. .................. 726/7 |

* cited by examiner

*Primary Examiner* — Kwasi Karikari
(74) *Attorney, Agent, or Firm* — Troutman Sanders, LLP; James E. Schutz; Andrew C. Doherty

(57) ABSTRACT

Certain aspects of a method and system for a wireless device to upload media to a web-based server may include a network that includes a wireless device and one or more mobile devices. The wireless device may be configured based on received authentication credentials from one or more mobile devices. A unique identification may be communicated automatically without user input, to the one or more mobile devices when the media content is newly generated by the wireless device. The received authentication credentials and the unique identification may enable the newly generated media content to be uploaded to the web-based sever. The wireless device may be operable to upload the newly generated media content to the web-based server via the one or more mobile devices, if the wireless device is unable to connect to the web-based server directly using wireless network credentials corresponding to one or more authorized wireless networks.

13 Claims, 6 Drawing Sheets

REMOTELY CONFIGURING A WIRELESS DEVICE AND UPLOADING MEDIA TO A SERVER

CLAIM OF PRIORITY

This patent application makes reference to, claims priority to and claims benefit from U.S. Provisional Patent Application Ser. No. 61/632,417 filed on Apr. 5, 2012.

The above stated application is hereby incorporated herein by reference in its entirety.

CROSS-REFERENCE TO RELATED APPLICATIONS/INCORPORATION BY REFERENCE

None.

FIELD

Certain aspects of the disclosure relate to uploading media to cloud based servers. More specifically, certain aspects of the disclosure relate to a method and system for remotely configuring a wireless device and uploading media to a web-based server.

BACKGROUND

Wi-Fi is a computer networking technology that uses radio waves to make a data connection in place of a traditional network cable. Formally called the Institute of Electronic and Electrical Engineers (IEEE) standard 802.11, it incorporates the radio frequencies, power levels and data encoding techniques needed to make a local wireless computer network practical. Although Wi-Fi works at distances up to 200 meters away, providing coverage for most homes, schools and small businesses, the process of connecting to a public Wi-Fi network is often cumbersome, requiring users to manually select the network they would like to use and provision their devices to properly operate with the network.

Further limitations and disadvantages of conventional and traditional approaches will become apparent to one of skill in the art, through comparison of such systems with some aspects of the present invention as set forth in the remainder of the present application with reference to the drawings.

SUMMARY

A system and/or method is provided for remotely configuring a wireless device and uploading media to a web-based server, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION

Certain implementations may be found in a system and/or method for remotely configuring a wireless device and uploading media to a web-based server. The web-based server may comprise a plurality of networked servers and databases, for example, an ad-hoc social networking server, a cloud storage server, and/or a photo-sharing server. Aspects may include a network that comprises a wireless device and one or more mobile devices. The wireless device may be operable to communicate with the one or more mobile devices in either a peer-to-peer ad-hoc wireless mode or an infrastructure mode. The wireless device may be configured based on received authentication credentials from one or more mobile devices. The received authentication credentials may enable the wireless device to upload media content to a web-based server via one or more mobile devices, or directly from the wireless device via one or more wireless networks. A unique identification may be communicated automatically without user input, to the one or more mobile devices when the media content is newly generated by the wireless device. The unique identification may enable the newly generated media content to be uploaded to the web-based sever. The wireless device may be operable to upload the newly generated media content to the web-based server via the one or more mobile devices, if the wireless device is unable to connect to the web-based server directly using wireless network credentials corresponding to one or more authorized wireless networks.

In accordance with another embodiment, the network may comprise a mobile device and one or more wireless devices. The mobile device may receive server authentication credentials for configuring the one or more wireless devices from a web-based server. The received server authentication credentials may enable one or more wireless devices to upload media content to the web-based server via the mobile device. The mobile device may be operable to communicate the received server authentication credentials and a unique identification to the one or more wireless devices. The unique identification may enable newly generated media content to be uploaded to the web-based sever. The mobile device may receive the unique identification and the newly generated media content from the one or more wireless devices. The mobile device may be operable to upload the newly generated media content to the web-based server.

Figure 1A:
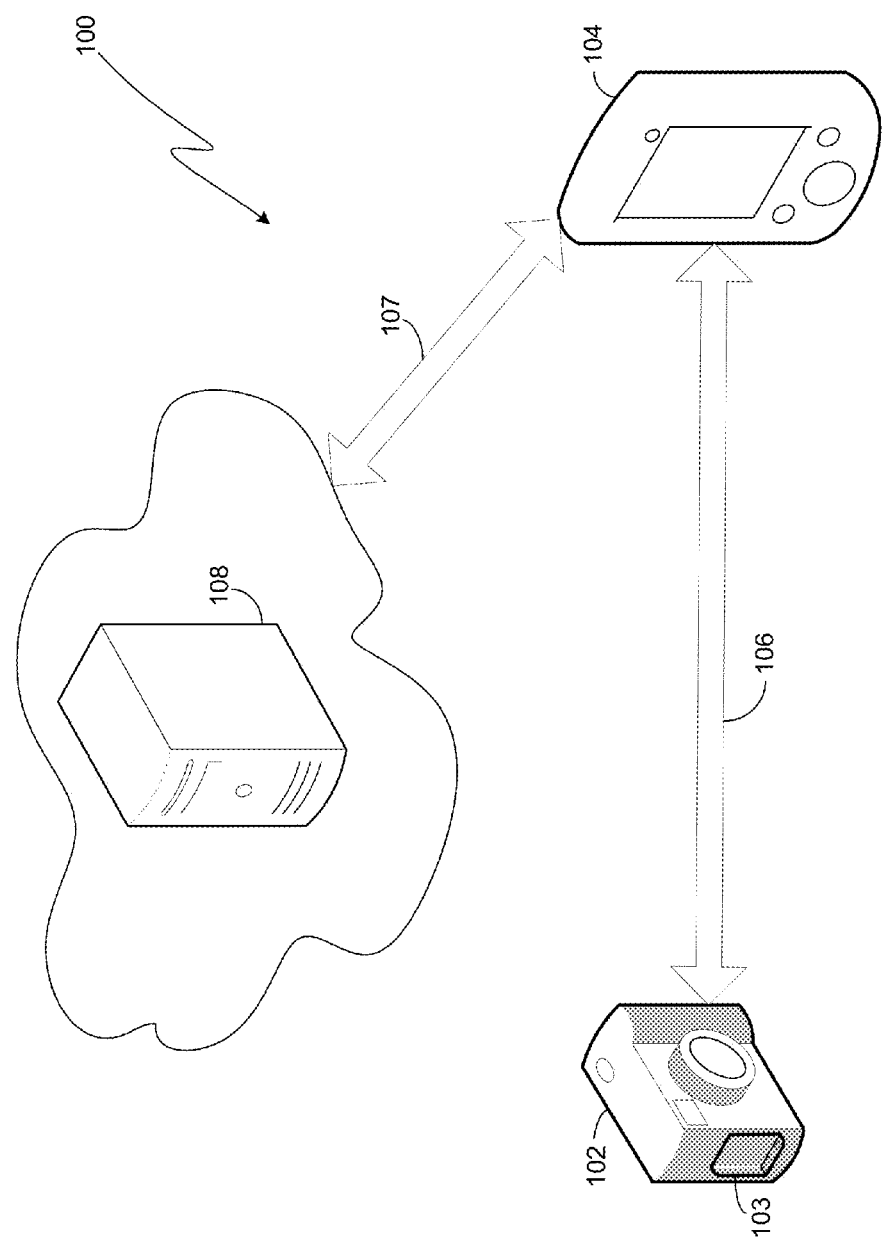
FIG. 1A is a block diagram illustrating uploading of media content to a web-based server via a mobile device.

FIG. 1A is a block diagram illustrating uploading of media content to a web-based server via a mobile device. Referring to FIG. 1A, there is shown a network 100 and a web-based server 108. The network 100 may comprise one or more wireless devices 102 and one or more mobile devices 104. The mobile device 104 may communicate with the web-based server 108 via a communication network 107. The wireless device 102 may be operable to communicate with the one or more mobile devices 104 in either a peer-to-peer ad-hoc wireless mode or an infrastructure mode.

In a peer-to-peer ad-hoc wireless mode, the wireless device 102 may be operable to directly communicate with the mobile device 104. The wireless device 102 and the mobile devices 104 within range may be operable to discover and communicate in peer-to-peer mode without involving central access points.

In an infrastructure mode, the wireless device 102 may be operable to join a wireless network or a wired Ethernet network, or support a central connection point via the mobile device 104. Either the mobile device 104 or the wireless device may function as an access point for wireless networking. The access point and other wireless clients may be configured to use the same service set identifier (SSID) to join the wireless local area networking (WLAN). The access point may be connected to a wired network to allow wireless clients access to, for example, Internet connections. One or more other access points may be utilized to increase a reach of the infrastructure and support any number of wireless clients.

The wireless device 102 may comprise suitable logic, circuitry, interfaces, and/or code that may be operable to generate media content by capturing still or video images via an electronic image sensor. In accordance with an embodiment, the wireless device 102 may be a digital camera, for example. The wireless device 102 may comprise a global positioning system (GPS) receiver to generate geo-tagged media content. The wireless device 102 may be operable to communicate utilizing one or more wireless communication protocols, for example, wireless local area networking (WLAN) such as Wi-Fi Direct, near field communication (NFC) and/or Bluetooth wireless communication protocols. The wireless device 102 may comprise memory for storing generated media content. The memory of the wireless device 102 may be in the form of a removable memory card 103, for example, a secure digital (SD) memory card for storing generated media content. The memory card 103 may comprise functionality for being auto-configured remotely via a communication protocol. The memory card 103 may comprise functionality for running one or more APIs or a web-based server, for example. The web-based server may comprise a URL that may link to an address for uploading newly generated media content. The newly generated media content may be uploaded in one or both of an original resolution or a resolution that may be optimized for uploading to the web-based server 108. The memory card 103 may be operable to store the received authentication credentials from the mobile device 104. The received authentication credentials may comprise login credentials for the web-based server 108, the upload token for the web-based sever 108, a list of authorized wireless networks, wireless network credentials corresponding to one or more of the authorized wireless networks and/or the unique identification.

The mobile device 104 may comprise suitable logic, circuitry, interfaces, and/or code that may be operable to communicate utilizing one or more communication protocols. In this regard, the mobile device 104 may be operable to transmit and/or receive data via the communication network 107 via one or more of CDMA, GSM, TDMA, GPRS, EDGE, UMTS, WCDMA, OFDM, TD-SCDMA, HSDPA and/or LTE cellular communication protocols, and one or more of WLAN, NFC and/or Bluetooth wireless communication protocols. Mobile devices may comprise laptop computers, tablet computers, mobile phones, personal digital assistants and/or personal media players, for example, or some other wireless device that is network capable and can send and receive information. The mobile device 104 may be operable to receive, process, and present multimedia content and may additionally be enabled to run a network browser or other applications for providing Internet services to a user of the mobile device 104.

The web-based server 108 may comprise suitable logic, circuitry, interfaces, and/or code that may be operable to generate server authentication credentials for configuring the one or more wireless devices 102. The web-based server 108 may comprise a plurality of networked servers and databases, for example, a social networking server, a data mining server, a communication and content server, a member profile database, a member location database, and/or a member usage database. The servers may perform different functions and may be separate processes that run on separate computers, or a single computer.

The network 100 may allow the wireless device 102 and the mobile device 104 to directly communicate with each other, for example, in a peer-to-peer ad-hoc wireless mode. The network 100 may grow or shrink without having to make any requests or reports to a central authority. When the mobile device 104 is operating in ad-hoc mode, they may act as network nodes that may discover and communicate with other wireless network nodes that are within their range of communication. This communication happens in peer-to-peer mode without requiring a wireless access point or router. The Bluetooth, NFC and Wi-Fi standards may provide peer-to-peer connectivity. Notwithstanding, other wireless standards that provide peer-to-peer connectivity may be used without limiting the scope of the invention. The peer-to-peer ad-hoc network 100 may use the mobile device 104 as an access point or gateway to connect to the Internet, for example.

In operation, the wireless device 102 may be switched ON and/or Wi-Fi may be activated on the wireless device 102 and the mobile device 104. The wireless device 102 may be operable to use a unique wireless device name to broadcast itself as a device capable of being auto-configured remotely via the Wi-Fi communication protocol. One of the mobile device 104 or the wireless device 102 may be operable to detect the other device automatically, and a network connection, for example, a peer-to-peer connection 106 may be established between the wireless device 102 and the mobile device 104. Notwithstanding, the disclosure may not be so limited, and the mobile device 104 may, upon request by a user, search for and detect the wireless device 102 with the unique wireless device name, and remotely request the wireless device 102 to enter into a configuration mode without limiting the scope of the disclosure. Alternatively, the wireless device 102 may, upon request by a user, search for and detect the mobile device 104, and request the mobile device 104 to enter into a configuration mode without limiting the scope of the disclosure.

The mobile device 104 may be operable to request server authentication credentials from the web-based server. The mobile device 104 may be operable to receive server authentication credentials for configuring the wireless device 102 from the web-based server 108. The received server authentication credentials may enable the wireless device 102 to upload media content to the web-based server 108 via the mobile device 104, if the wireless device 102 is unable to connect to the web-based server 108 directly using wireless network credentials corresponding to one or more authorized wireless networks. The received server authentication credentials may comprise one or both of login credentials for the web-based server 108 and/or an upload token for the web-based sever 108. The mobile device 104 may be operable to utilize the received upload token to identify a specific user account for uploading the newly generated media content to the web-based server 108. The received upload token may be generated based on a hash operation of a user's authentication credentials and a date, for example. The received upload token for the web-based server 108 may expire after a predetermined period of time.

The mobile device 104 may be operable to communicate the received server authentication credentials to the wireless device 102 via a communication protocol. The communicated server authentication credentials may be encrypted by the mobile device 104. The mobile device 104 may be operable to communicate a list of authorized wireless networks and wireless network credentials corresponding to one or more of the authorized wireless networks to the wireless device 102 via a communication protocol.

The mobile device 104 may be operable to communicate a unique identification to the wireless device 102 via a communication protocol. The unique identification may enable newly generated media content to be uploaded to the web-based sever 108. The unique identification may comprise credentials for a particular wireless network to be used by the wireless device 102 for uploading the newly generated media content to the web-based server 108 via the mobile device 104.

The wireless device 102 may be configured based on received authentication credentials from the mobile device 104. The received authentication credentials may comprise login credentials for the web-based server 108, the upload token for the web-based sever 108, a list of authorized wireless networks, wireless network credentials corresponding to one or more of the authorized wireless networks and/or the unique identification. The received authentication credentials may enable the wireless device 102 to upload media content to a web-based server 108 via the mobile device 104, if the wireless device 102 is unable to connect to the web-based server 108 directly using wireless network credentials corresponding to one or more authorized wireless networks. After the completion of the remote configuration of the wireless device 102, the wireless device 102 may no longer advertise itself using the unique wireless device name.

When a new photo is captured or a new video is recorded by the wireless device 102, the wireless device 102 may communicate automatically without user input, the unique identification to the mobile device 104 indicating the generation of new media content that may need to be uploaded to the web-based server 108. The wireless device 102 may be operable to dynamically enable and/or disable itself from communicating the unique identification to the mobile device 104 to optimize a battery life of the wireless device 102.

The mobile device 104 may be operable to detect the unique identification from the wireless device 102 and establish a peer-to-peer connection 106 with the wireless device 102. The wireless device 102 may be running one or more application programming interfaces (APIs) or a web-based server, for example. The web-based server may comprise a uniform resource locator (URL) that may link to an address for uploading newly generated media content. The newly generated media content may be uploaded in one or both of an original resolution or a resolution that may be optimized for uploading to the web-based server 108. The mobile device 104 may extract the newly generated media content from the wireless device 102.

The wireless device 102 may be operable to upload the newly generated media content to the web-based server 108 via the mobile device 104 capable of handling one or more cellular communication protocols, if the wireless device 102 is unable to connect to the web-based server 108 using the wireless network credentials corresponding to one or more of the authorized wireless networks.

Figure 1B:
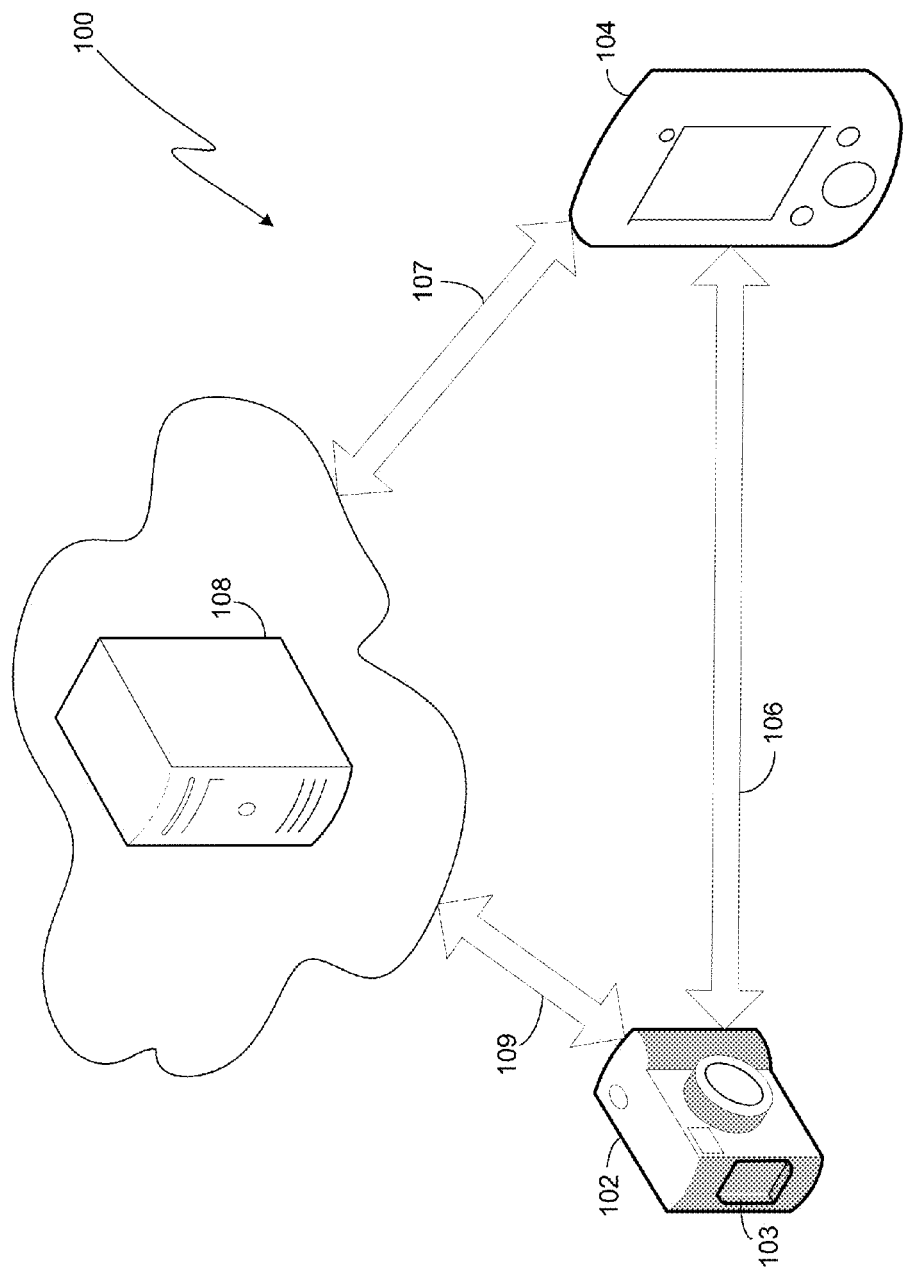
FIG. 1B is a block diagram illustrating uploading of media content to a web-based server via a wireless device.

FIG. 1B is a block diagram illustrating uploading of media content to a web-based server via a wireless device. Referring to FIG. 1B, there is shown the network 100 and a web-based server 108. The network 100 may comprise the one or more wireless devices 102 and the one or more mobile devices 104. The network 100, the wireless devices 102, the mobile devices 104, and the web-based server 108 may be substantially similar to the corresponding ones as described with respect to FIG. 1A.

In a representative embodiment, the wireless device 102 may comprise memory for storing generated media content. The memory of the wireless device 102 may be in the form of a removable memory card 103, for example, a secure digital (SD) memory card for storing generated media content. The memory card 103 may comprise functionality for being auto-configured remotely via a communication protocol. The memory card 103 may comprise functionality for running one or more APIs or a web-based server, for example. The web-based server may comprise a URL that may link to an address for uploading newly generated media content. The newly generated media content may be uploaded in one or both of an original resolution or a resolution that may be optimized for uploading to the web-based server 108. The memory card 103 may be operable to store the received authentication credentials from the mobile device 104. The received authentication credentials may comprise login credentials for the web-based server 108, the upload token for the web-based sever 108, a list of authorized wireless networks, wireless network credentials corresponding to one or more of the authorized wireless networks and/or the unique identification.

In operation, when a new photo is captured or a new video is recorded by the wireless device 102, the memory card 103 in the wireless device 102 may automatically without user input, run an application to upload the newly generated media content to the web-based server 108 via an open wireless connection 109. The wireless device 102 may be operable to upload the newly generated media content to the web-based server 108 using the wireless network credentials corresponding to one or more of the authorized wireless networks, login credentials for the web-based server 108, and/or the upload token for the web-based sever 108. If the wireless device 102 is unable to connect to the web-based server 108 using the wireless network credentials corresponding to one or more of the authorized wireless networks, the wireless device 102 may be operable to upload the newly generated media content to the web-based server 108 via the mobile device 104 capable of handling one or more cellular communication protocols.

Figure 2:
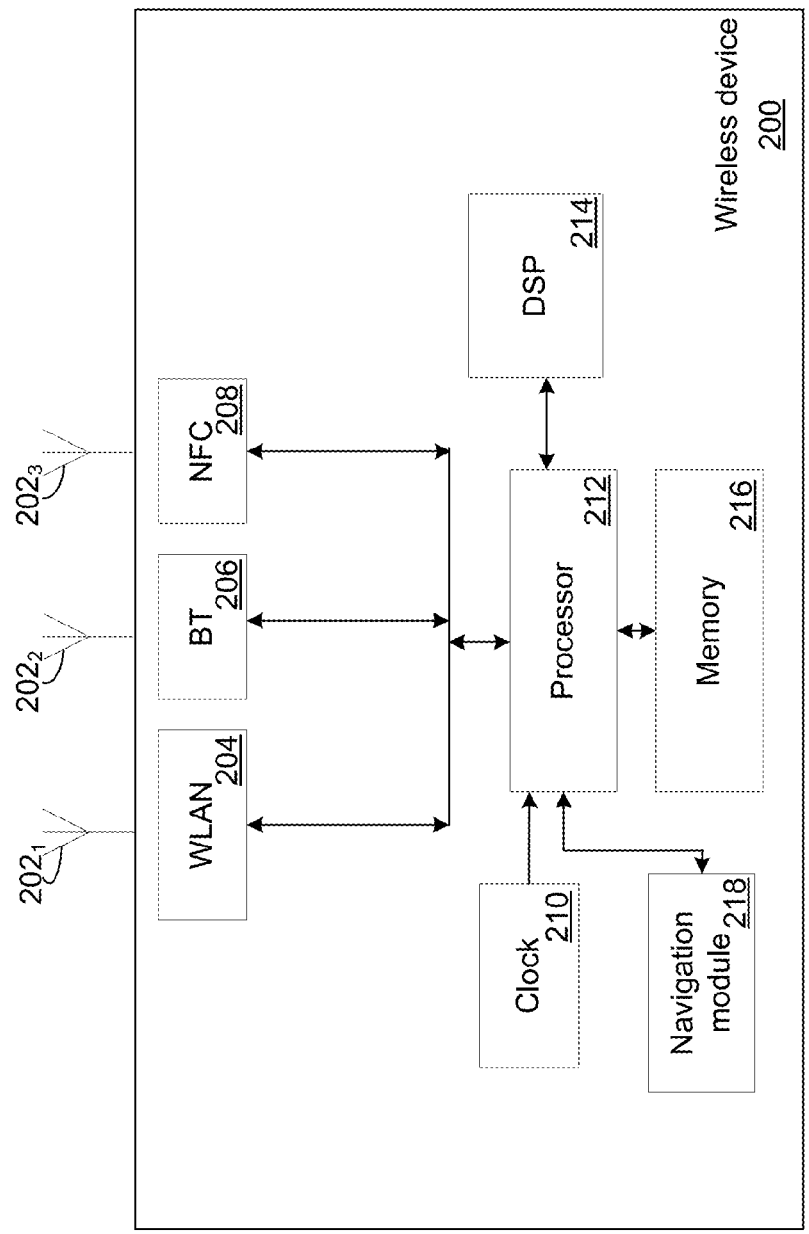
FIG. 2 is a block diagram of a wireless device.

FIG. 2 is a block diagram of a wireless device. Referring to FIG. 2, there is shown a wireless device 200. The wireless device 200 may be a detailed depiction of the wireless device 102 as described with respect to FIGS. 1A and 1B. The wireless device 200 may comprise a plurality of radios and antennas $202_{1...3}$ to receive and transmit signals associated with the one or more radios. For example, the wireless device 200 may comprise a WLAN radio 204, a Bluetooth radio 206, and a NFC radio 208. The wireless device 200 may further comprise a clock 210, a processor 212, a memory 216, a digital signal processor (DSP) 214, and a navigation module 218.

In accordance with an embodiment, Bluetooth wireless protocol may be used to provide short-range peer-to-peer connections between the mobile device 104 and the Bluetooth radio 206 in the wireless device 200. A Bluetooth network may be made up of small subnets or piconets. A piconet may consist of two or more connected nodes sharing the same channel. Every piconet may have one master and at least one slave, where slaves may use the master to communicate with each other. Two or more piconets that have a node in common may connect with each other to form a scatternet. A slave node in one piconet may be a master node in another piconet.

The range of Bluetooth may be dependent on power and Bluetooth-class, which may be typically of the order of 10-200 feet, for example.

In accordance with another embodiment, the Wi-Fi Direct wireless protocol may be used to provide short-range peer-to-peer connections between the mobile device 104 and the WLAN radio 204 in the wireless device 200. The Wi-Fi Direct protocol may have a maximum range of over 600 feet and speeds of up to 250 Mbps and may allow a mobile device to advertise itself as a combination of a software access point and a peer. A mobile device 104 with Wi-Fi Direct may have a peer-to-peer connection 106 to the wireless device 200, while having a cellular connection 107 to a web-based server 108. The Wi-Fi Direct protocol may provide security with WPA2 encryption and Wi-Fi Protection Setup (WPS) secure key handling. The mobile device 104 may be operable to configure the wireless device 200 to communicate in ad-hoc mode and to use the same wireless network and channel when sharing information with each other. The NFC radio 208 may be operable to support two way communication between the mobile device 104 and the wireless device 200 in close proximity similar to the WLAN radio 204 and the Bluetooth radio 206.

The clock 210 may be operable to time stamp the generated media content. The DSP 214 may be operable to process the generated media content before uploading the generated media content to the web-based server 108. For example, the DSP 214 may be operable to crop, re-size or modify a resolution of the generated media content.

The processor 212 may comprise suitable logic, circuitry, interfaces, and/or code that may be operable to manage the operations of the plurality of radios 204-208. The processor 212 may be operable to configure the wireless device 200 based on received authentication credentials from the mobile device 104. The received authentication credentials may comprise login credentials for the web-based server 108, the upload token for the web-based sever 108, a list of authorized wireless networks, wireless network credentials corresponding to one or more of the authorized wireless networks and/or the unique identification. The received authentication credentials may enable the processor 212 in the wireless device 102 to upload media content to a web-based server 108. The processor 212 may be operable to dynamically enable and/or disable the wireless device 200 from broadcasting the unique identification to the mobile device 104 to optimize a battery life of the wireless device 102.

The memory 216 may comprise a ROM for program storage and generated media content and a RAM for running programs. In a representative embodiment, the memory 216 may be in the form of a removable memory card 103 as described with respect to FIG. 1B, for example, a SD memory card for storing generated media content. The memory 216 may comprise functionality for running one or more APIs or a web-based server, for example. The web-based server may comprise a URL that may link to an address for uploading newly generated media content. The newly generated media content may be uploaded in one or both of an original resolution or a resolution that may be optimized for uploading to the web-based server 108. The memory 216 may be operable to store the received authentication credentials from the mobile device 104. The received authentication credentials may comprise login credentials for the web-based sever 108, the upload token for the web-based sever 108, a list of authorized wireless networks, wireless network credentials corresponding to one or more of the authorized wireless networks and/or the unique identification.

The navigation module 218 may be operable to tag generated media content with location information. The navigation module 218 may provide latitude and longitude information. The navigation module 218 may also convert the latitude/longitude information to street addresses for maps. The location coordinates, 3D orientation, velocity, and data/time information may be included in the generated content, coded in the filename of the content, or stored and sent in a separate metafile or message that is associated with the content.

Figure 3:
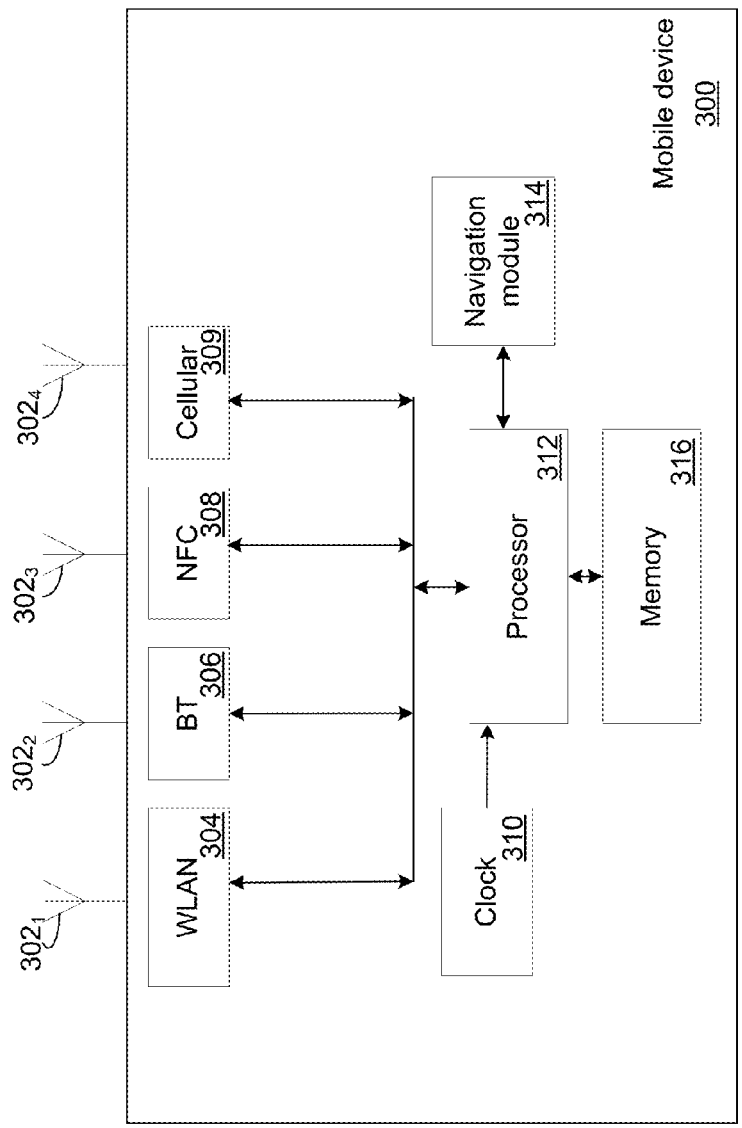
FIG. 3 is a block diagram of a mobile device.

FIG. 3 is a block diagram of a mobile device. Referring to FIG. 3, there is shown a mobile device 300. The mobile device 300 may be a detailed depiction of the mobile device 104 as described with respect to FIGS. 1A and 1B. The mobile device 300 may comprise a plurality of radios and antennas $302_{1...4}$ to receive and transmit signals associated with the one or more radios. For example, the mobile device 300 may comprise a WLAN radio 304, a Bluetooth radio 306, a NFC radio 308, and a cellular radio 309. The mobile device 300 may further comprise a clock 310, a processor 312, a memory 316, and a navigation module 314. The plurality of radios 304, 306, and 308 may be substantially similar to the plurality of radios 204, 206, and 208 respectively, as described with respect to FIG. 2. The clock 310 may be operable to time stamp generated media content on the mobile device 300, for example.

The cellular radio 309 may comprise suitable logic, circuitry, interfaces, and/or code that may be operable to transmit and/or receive signals corresponding to one or more cellular communication protocols comprising one or more of CDMA, GSM, TDMA, GPRS, EDGE, UMTS, WCDMA, OFDM, TD-SCDMA, HSDPA and/or LTE cellular communication protocols.

The processor 312 may comprise suitable logic, circuitry, interfaces, and/or code that may be operable to manage the operations of the plurality of radios 304-309. The processor 312 may be operable to receive the server authentication credentials from the web-based server 108. The processor 312 may be operable to communicate the received server authentication credentials to the wireless device 102. The received server authentication credentials may enable the wireless device 102 to upload media content to the web-based server 108. The processor 312 may be operable to communicate a unique identification to the wireless device 102. The unique identification may enable newly generated media content to be uploaded to the web-based sever 108 via the mobile device 300. The processor 312 may detect the unique identification and extract the newly generated media content from the wireless device 102. The processor 312 may be operable to upload the newly generated media content to the web-based server 108.

The memory 316 may comprise a ROM for program storage and generated media content and a RAM for running programs. The operating system interfaces the hardware with the user and manages resources. Input devices of the mobile device 300 may include a keyboard and/or a touch screen, a microphone, and a camera photo-sensor for still pictures and video. Output devices of the mobile device 300 may comprise a display, a speaker, and wired or wireless headsets. The mobile device 300 may have a number of dedicated applications such as ad-hoc social networking, server-based social networking, email, instant messenger, chat, SMS, and/or camera. The mobile device 300 may have a browser that may browse information on the intranet/Internet and download other applications from the network. A bus may link all these components with the processor 312 and memory 316.

The navigation module 314 may be operable to tag generated media content with location information. The navigation module 314 may provide latitude and longitude information or some other coordinate system. The navigation module 314 may also convert the latitude/longitude information to street addresses for maps. The location coordinates, 3D orientation, velocity, and data/time information may be included in the generated content, coded in the filename of the content, or stored and sent in a separate metafile or message that is associated with the content. The content generated by applications such as email, chat, SMS, social networking tools, and/or a camera may be complemented with location, orientation, velocity, and date/time information, if the user/member chooses to do so by setting the appropriate security preferences at the content level or at the application level. The mobile device 300 may upload the geo-tagged content for storage on networked geo-tagged user content databases. Some of the user security preferences may be stored locally on the mobile device 300, while others may be stored on user/member profile databases that are accessible to networked servers that provide applications (e.g. email, chat, social networking). If a member has disabled continuous position tracking but has enabled content tagging, then the uploaded geo-tagged content may be used to extract position and velocity information. The navigation module 314 may indicate the location of the mobile device 300 on a map and track the speed and direction of movement of the mobile device 300.

Figure 4:
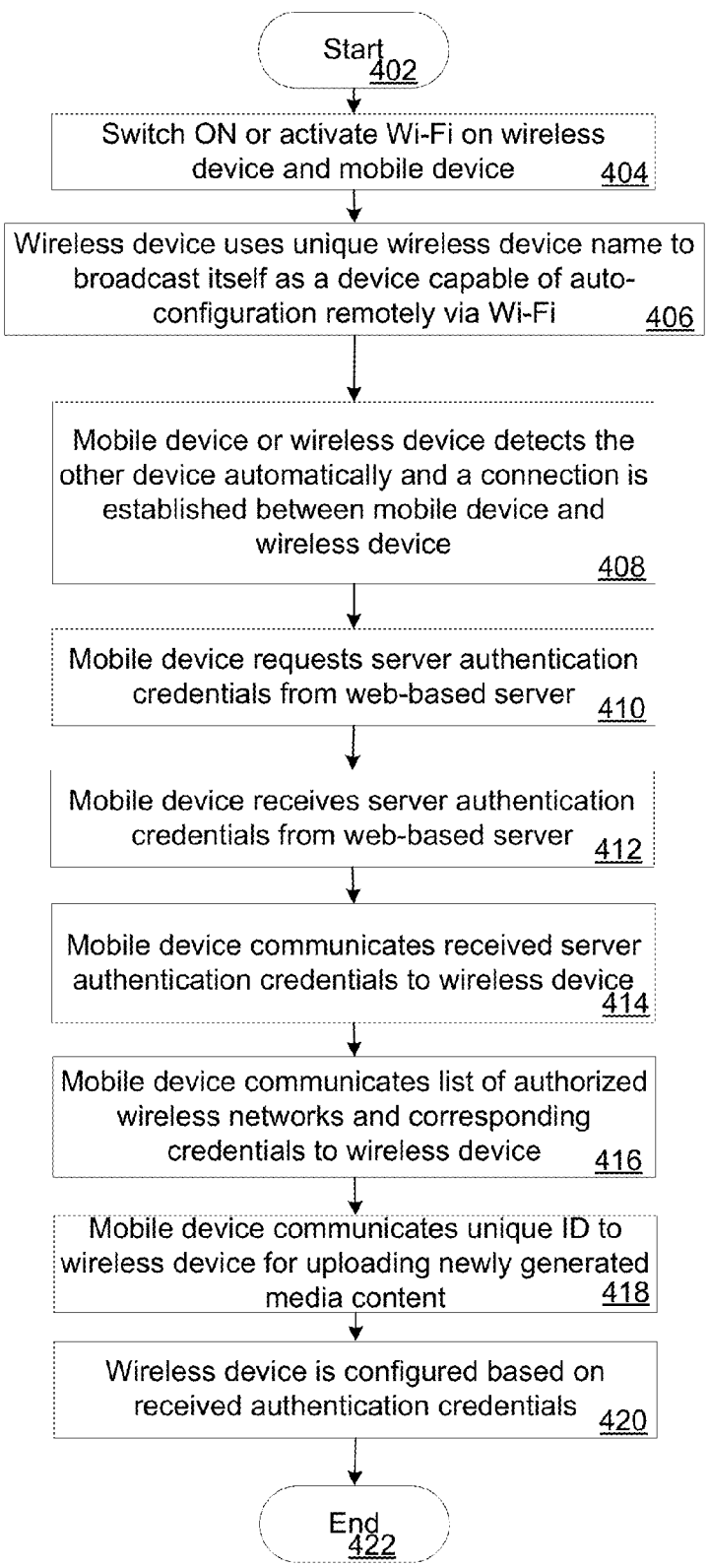
FIG. 4 is a flow chart illustrating a process for establishing a network between a mobile device and a wireless device for remote configuration of the wireless device.

FIG. 4 is a flow chart illustrating a process for establishing a network between a mobile device and a wireless device for remote configuration of the wireless device. Referring to FIG. 4, steps may begin at step 402.

In step 404, the wireless device 102 may be switched ON and/or Wi-Fi may be activated on the wireless device 102 and the mobile device 104. In step 406, the wireless device 102 may be operable to use a unique wireless device name to broadcast itself as a device capable of auto-configuration remotely via Wi-Fi. In step 408, one of the mobile device 104 or the wireless device 102 may be operable to detect the other device with the unique wireless device name automatically, and a network connection, for example, a peer-to-peer connection 106 may be established between the mobile device 104 and the wireless device 102. Notwithstanding, the disclosure is not necessarily so limited, and the mobile device 104 may, upon request by a user, search for the wireless device 102, and detect the wireless device 102 with the unique wireless device name, without limiting the scope of the disclosure.

In step 410, the mobile device 104 may be operable to request server authentication credentials from the web-based server 108. In step 412, the mobile device 104 may be operable to receive server authentication credentials for configuring the wireless device 102 from the web-based server 108. The received server authentication credentials may enable the wireless device 102 to upload media content to the web-based server 108 via the mobile device 104, if the wireless device 102 is unable to connect to the web-based server 108 directly via the wireless connection 109. The received server authentication credentials may comprise one or both of login credentials for the web-based server 108 and/or an upload token for the web-based sever 108. The mobile device 104 may be operable to utilize the received upload token to identify a specific user account for uploading the newly generated media content to the web-based server 108. The received upload token may be generated based on a hash operation of a user's authentication credentials and a date, for example. The received upload token for the web-based server may expire after a pre-determined period of time.

In step 414, the mobile device 104 may be operable to communicate the received server authentication credentials to the wireless device 102 via a communication protocol. The communicated server authentication credentials may be encrypted by the mobile device 104. In step 416, the mobile device 104 may be operable to communicate a list of authorized wireless networks and wireless network credentials corresponding to one or more of the authorized wireless networks to the wireless device 102 via a communication protocol.

In step 418, the mobile device 104 may be operable to communicate a unique identification to the wireless device 102 via a communication protocol. The unique identification may enable newly generated media content to be uploaded to the web-based sever 108. The unique identification may comprise credentials for a particular wireless network to be used by the wireless device 102 for uploading the newly generated media content to the web-based server 108 via the mobile device 104.

In step 420, the wireless device 102 may be configured based on received authentication credentials from the mobile device 104. The received authentication credentials may comprise login credentials for the web-based server 108, the upload token for the web-based sever 108, a list of authorized wireless networks, wireless network credentials corresponding to one or more of the authorized wireless networks and/or the unique identification. The received authentication credentials may enable the wireless device 102 to upload media content to a web-based server 108 via the mobile device 104, if the wireless device 102 is unable to connect to the web-based server 108 directly using wireless network credentials corresponding to one or more authorized wireless networks. The wireless device 102 may no longer advertise itself using the unique wireless device name. Control then passes to end step 422.

Notwithstanding, the disclosure may not be so limited, and the mobile device 104 may, upon request by a user, search for and detect the wireless device 102 with the unique wireless device name, and remotely request the wireless device 102 to enter into a configuration mode without limiting the scope of the disclosure. Alternatively, the wireless device 102 may, upon request by a user, search for and detect the mobile device 104, and request the mobile device 104 to enter into a configuration mode without limiting the scope of the disclosure.

Figure 5:
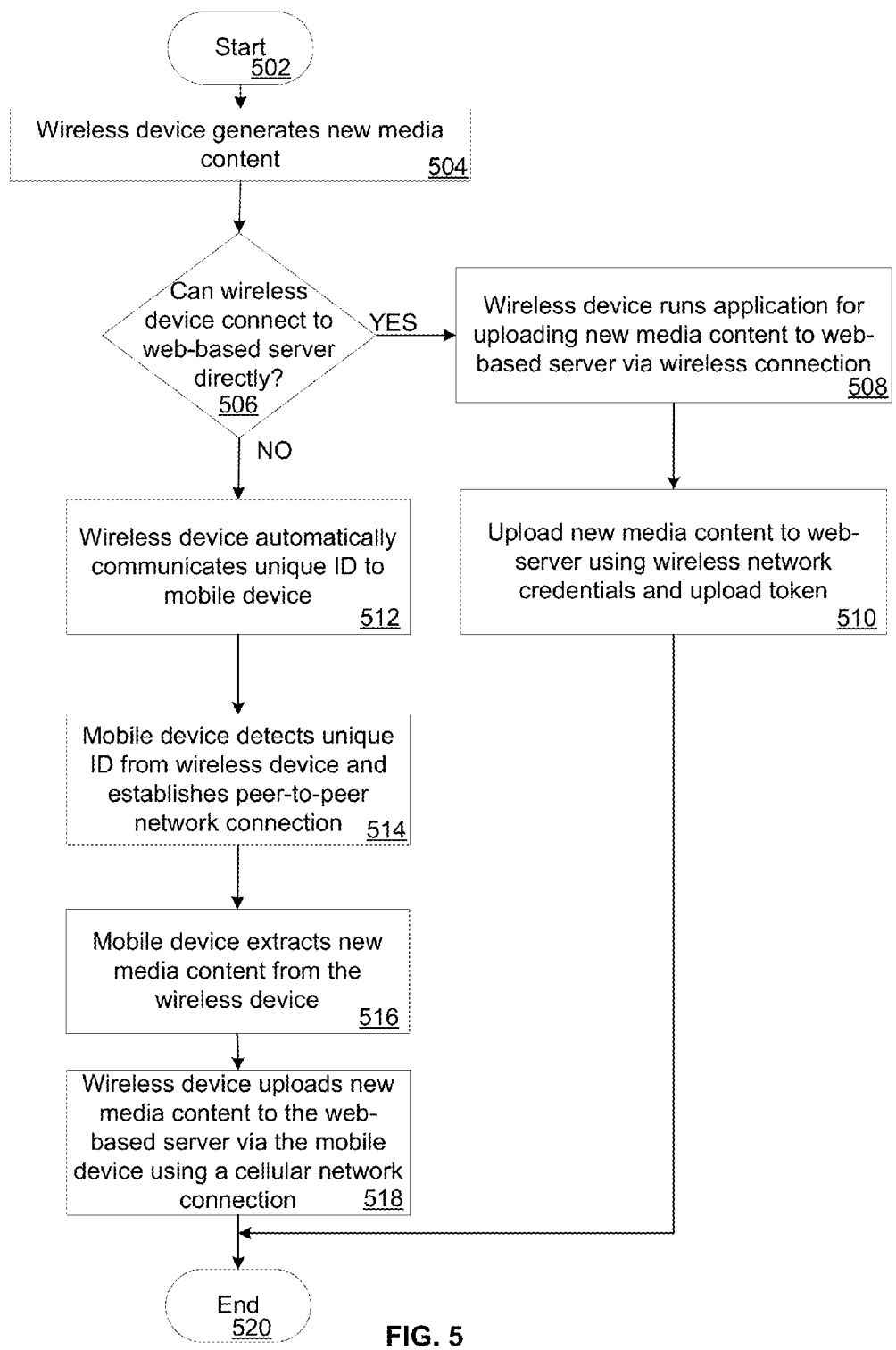
FIG. 5 is a flow chart illustrating a process for uploading of media content to a web-based server.

FIG. 5 is a flow chart illustrating a process for uploading of media content to a web-based server. Referring to FIG. 5, steps may begin at step 502.

In step 504, new media content is generated by the wireless device 102. In step 506, it may be determined whether the wireless device 102 is able to connect to the web-based server 108 directly. In instances where the wireless device 102 is able to connect to the web-based server 108 directly, control passes to step 508.

In step 508, the wireless device 102 may automatically without user input, run an application for uploading the newly generated media content to the web-based server 108 via the wireless connection 109. In step 510, the wireless device 102 may be operable to upload the newly generated media content to the web-based server 108 using the wireless network credentials corresponding to one or more of the authorized wireless networks and/or the upload token for the web-based sever 108. Control then passes to end step 520.

In instances where the wireless device 102 is not able to connect to the web-based server 108 directly, control passes to step 512. In step 512, the wireless device 102 may broadcast automatically without user input, the unique identification to the mobile device 104 indicating the generation of new media content that may need to be uploaded to the web-based server 108. In step 514, the mobile device 104 may be operable to detect the unique identification from the wireless device 102 and establish a peer-to-peer connection 106 with the wireless device 102. In step 516, the mobile device 104 may extract the newly generated media content from the wireless device 102. In step 518, the wireless device 102 may be operable to upload the newly generated media content to the web-based server 108 via the mobile device 104 using one or more cellular communication protocols. Control then passes to end step 520.

In accordance with an embodiment of the invention, a method and system for remotely configuring a wireless device and uploading media to a web-based server may comprise a network 100 (FIGS. 1A and 1B) that comprises a wireless device 102 (FIGS. 1A and 1B) and one or more mobile devices 104 (FIGS. 1A and 1B). The wireless device 102 may be operable to communicate with the one or more mobile devices 104 in either a peer-to-peer ad-hoc wireless mode or an infrastructure mode. The wireless device 102 may be configured based on received authentication credentials from one or more mobile devices 104. The received authentication credentials may enable the wireless device 102 to upload media content to a web-based server 108 (FIGS. 1A and 1B) via one or more mobile devices 104, if the wireless device 102 is unable to connect to the web-based server 108 using the wireless network credentials corresponding to one or more of the authorized wireless networks. A unique identification may be communicated automatically without user input, to the one or more mobile devices 104 when the media content is newly generated by the wireless device 102. The unique identification may enable the newly generated media content to be uploaded to the web-based sever 108. The wireless device 102 may be operable to upload the newly generated media content to the web-based server 108 via the one or more mobile devices 104, if the wireless device 102 is unable to connect to the web-based server 108 using the wireless network credentials corresponding to one or more of the authorized wireless networks.

The received authentication credentials may comprise one or more of login credentials for the web-based server 108, an upload token for the web-based sever 108, a list of authorized wireless networks, wireless network credentials corresponding to one or more of the authorized wireless networks and/or the unique identification. The wireless device 102 may be operable to upload the newly generated media content to the web-based server 108 using the wireless network credentials corresponding to one or more of the authorized wireless networks. The wireless device 102 may be operable to upload the newly generated media content to the web-based server 108 via one or more mobile devices 104 capable of handling one or more cellular communication protocols, if the wireless device 102 is unable to connect to the web-based server 108 using the wireless network credentials corresponding to one or more of the authorized wireless networks.

The wireless device 102 may be capable of handling one or more wireless communication protocols comprising one or more of a WLAN communication protocol, a Bluetooth communication protocol, and/or a Near Field Communications (NFC) communication protocol. The wireless device 102 may be operable to dynamically enable and/or disable itself from communicating the unique identification to the one or more mobile devices 104 to optimize a battery life of the wireless device 102. The unique identification may comprise credentials for a particular wireless network to be used by the wireless device 102 for uploading the newly generated media content to the web-based server 108 via the mobile device 104.

In accordance with another embodiment of the invention, the wireless device 102 may be configured or authorized based on received authentication credentials from one or more mobile devices 104. The received authentication credentials may enable the wireless device 102 to upload media content to a web-based server 108. The wireless device 102 may be operable to upload automatically without user input, the media content to the web-based server 108 using the received authentication credentials when the media content is generated by the wireless device 102. The received authentication credentials may comprise one or more of login credentials for the web-based server 108, an upload token for the web-based sever 108, a list of authorized wireless networks, wireless network credentials corresponding to one or more of the authorized wireless networks and/or a unique identification indicating the generated media content to be uploaded to the web-based sever 108.

The wireless device 102 and/or the mobile device 104 may be operable to utilize the received upload token to identify a specific user account for uploading the generated media content to the web-based server 108. The received upload token for the web-based server 108 may expire after a pre-determined period of time.

In accordance with another embodiment of the disclosure, a method and system for remotely configuring a wireless device and uploading media to a web-based server may comprise a network 100. The network 100 may comprise a mobile device 104 and one or more wireless devices 102. The mobile device 104 may be operable to receive server authentication credentials for configuring or authorizing the one or more wireless devices 102 from a web-based server 108. The received server authentication credentials may enable one or more wireless devices 102 to upload media content to the web-based server 108 via the mobile device 104. The mobile device 104 may be operable to communicate the received server authentication credentials and a unique identification to the one or more wireless devices 102. The unique identification may enable newly generated media content to be uploaded to the web-based sever 108. The mobile device 104 may detect the unique identification and the newly generated media content from the one or more wireless devices 102. The mobile device 104 may be operable to upload the newly generated media content to the web-based server 108.

The received server authentication credentials may comprise one or both of login credentials for the web-based server 108 and/or an upload token for the web-based sever 108. The mobile device 104 may be operable to utilize the received upload token to identify a specific user account for uploading the newly generated media content to the web-based server 108. The received upload token for the web-based server may expire after a pre-determined period of time. The mobile device 104 may be operable to communicate a list of authorized wireless networks and wireless network credentials corresponding to one or more of the authorized wireless networks to the one or more wireless devices 102. The mobile device 104 may be capable of handling one or more cellular communication protocols comprising one or more of CDMA, GSM, TDMA, GPRS, EDGE, UMTS, WCDMA, OFDM, TD-SCDMA, HSDPA and/or LTE cellular communication protocols. The unique identification may comprise credentials for a particular wireless network to be used by the one or more wireless devices 102 for uploading the newly generated media content to the web-based server 108 via the mobile device 104. The mobile device 104 may be operable to communicate with the one or more wireless devices 102 in one of a peer-to-peer ad-hoc wireless mode and an infrastructure mode, for example.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps comprising a network that comprises a wireless device and one or more mobile devices. The wireless device may be configured based on received authentication credentials from one or more mobile devices. The received authentication credentials may enable the wireless device to upload media content to a web-based server via one or more mobile devices. A unique identification may be communicated automatically without user input, to the one or more mobile devices when the media content is newly generated by the wireless device. The unique identification may enable the newly generated media content to be uploaded to the web-based sever. The wireless device may be operable to upload the newly generated media content to the web-based server via the one or more mobile devices.

Accordingly, the present invention may be realized in hardware, or a combination of hardware and software. The present invention may be realized in a centralized fashion in at least one computer system, or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
receiving, at a mobile device, from a web-based server, server authentication credentials, comprising at least an upload token for the web-based server wherein the server authentication credentials enable a wireless device to upload media content to the web-based server using the mobile device and the upload token is generated based on a hash operation;
communicating, by the mobile device, to the wireless device, the server authentication credentials;
receiving, at the mobile device, from the wireless device, the media content;
determining, by the mobile device, based on the upload token, a specific user account to which to upload the media content; and
uploading, by the mobile device, to the web-based server, the media content using the server authentication credentials.

2. The method of claim 1, wherein the server authentication credentials include login credentials for the web-based server.

3. The method of claim 1, wherein the upload token is generated based on a hash operation.

4. A method, comprising:
receiving, by a wireless device, from a mobile device, authentication credentials, comprising at least an upload token for a web-based server, wherein the upload token is generated based on a hash operation;
communicating, by the wireless device, to the mobile device, without user input, the authentication credentials upon media content being newly generated by the wireless device; and
uploading, by the wireless device, to the mobile device, the media content such that the mobile device uploads the media content to the web-based server to a specific user account based on the upload token.

5. The method of claim 4, wherein the authentication credentials further include at least one of login credentials for the web-based server, a list of at least one authorized wireless network, and wireless network credentials corresponding to the at least one authorized wireless network.

6. The method of claim 4, wherein the upload token is generated based on a hash operation.

7. The method of claim 4, wherein uploading the media content is responsive to generating the media content.

8. The method of claim 4, wherein the wireless device includes a camera and the media content includes at least one captured image.

9. A system, comprising:
a wireless device having a processor operatively coupled to a memory, wherein the processor and the memory are configured to:
receive, from a mobile device, authentication credentials, wherein the authentication credentials include at least an upload token for a web-based server, wherein the upload token is generated based on a hash operation;
communicate, to the mobile device, without user input, the authentication credentials upon media content being newly generated by the wireless device; and
upload, to the mobile device, the media content so that the mobile device uploads the media content to the web-based server to a specific user account based on the upload token.

10. The system of claim 9, wherein the authentication credentials further include at least one of login credentials for the web-based server, a list of at least one authorized wireless network, and wireless network credentials corresponding to the at least one authorized wireless network.

11. The system of claim 9, wherein the upload token is generated based on a hash operation.

12. The system of claim 9, wherein the processor and the memory of the wireless device are further configured to:
upload, to the mobile device, the media content without user input responsive to generating the media content.

13. The system of claim 9, wherein the wireless device includes a camera and the media content includes at least one captured image.

\* \* \* \* \*